July 21, 1936.  A. U. SÄRNMARK  2,048,355

ABSORPTION COLD APPARATUS

Filed July 25, 1931  8 Sheets-Sheet 3

INVENTOR
Axel Uno Särnmark.
BY Cameron, Kerkam + Sutton
ATTORNEYS.

July 21, 1936. A. U. SÄRNMARK 2,048,355
ABSORPTION COLD APPARATUS
Filed July 25, 1931 8 Sheets-Sheet 4

Fig. 20

INVENTOR
Axel Uno Sarnmark.
BY Cameron, Kerkam + Sutton.
ATTORNEYS.

July 21, 1936.　　　A. U. SÄRNMARK　　　2,048,355
ABSORPTION COLD APPARATUS
Filed July 25, 1931　　　8 Sheets-Sheet 6

INVENTOR
Axel Uno Sarnmark
BY Cameron, Kerkam & Sutton
ATTORNEYS.

Patented July 21, 1936

2,048,355

UNITED STATES PATENT OFFICE 2,048,355

ABSORPTION COLD APPARATUS

Axel Uno Särnmark, Gothenburg, Sweden

Application July 25, 1931, Serial No. 553,157
In Sweden July 28, 1930

24 Claims. (Cl. 62—119.5)

The present invention relates to improvements in absorption cold apparatus of the kind which in addition to cold and absorption mediums also contain an auxiliary medium, for example a gas or gas mixture, for equalizing the pressure differences in the apparatus.

One object of the invention is to improve the cold effect in such apparatus by a special construction of the refrigerator and the absorber or the combined refrigerator-absorber, whereby the transfer of cold medium vapours evaporated in the refrigerator to the absorber is greatly facilitated. The invention also has for its object to prevent, more or less, a harmful or unwanted circulation of auxiliary and/or cold medium in the apparatus.

Another object of the invention is to improve the cold effect as well as the efficiency of the apparatus by a special construction of the temperature exchangers and the means for circulation of the absorption solution, and further to provide means for simply regulating the circulation velocity of the absorption solution as well as the concentration thereof, i. e. the proportions of cold medium and absorption medium in the absorber, generator etc.

A further object of the invention is to provide means in the form of pressure equalizing devices for ensuring a regular and reliable functioning of the apparatus, and means are also provided for ensuring an effective cooling by air of such parts of the apparatus which for their proper functioning must be deprived of heat.

In order to attain these objects as well as other objects which will be clear from the following description the apparatus is so arranged and constructed that the cold medium vapours evaporated in the refrigerator respectively, the upper part of the combined refrigerator-absorber, are conveyed to the absorption medium flowing into or descending in the absorber respectively, the lower part of the refrigerator-absorber, by combination and co-operation of gravity and friction arising within the apparatus and acting on the cold medium vapours descending directly from the cold medium flowing over the evaporation surfaces, as well as the vapour pressure forces effective between the refrigerator and the absorber.

Suitable volatile substances may be used as a cold medium, as for example ammonia or organic substances, such as methyl amine, or preferably, substances the vapours of which are comparatively heavy, for example ether, methyl formiate, methylene chloride, ethyl bromide, methylal, carbon disulphide etc., or mixtures of different substances, for example methyl formiate and carbon disulphide, for example equal parts of each.

Water may be used as an absorption medium for ammonia or methyl amine, to which may be added other substances, for example lithium or calcium chloride. For ether, methyl formiate and the other cold mediums mentioned above various organic absorption mediums may be used. for example dichlor hydrine or nitro-compounds. such as nitrobenzol, alone or as mixtures or admixed with other substances.

The auxiliary medium may consist of a gas, for example air, hydrogen, methane, helium or the like or mixtures of such substances.

Other suitable substances which may be used as absorption medium, cold medium and auxiliary medium in the apparatus according to the invention are described and claimed in my co-pending application No. 536,855, issued on April 17, 1934, as Patent No. 1,955,345.

Cold is produced in the refrigerator or the upper part of the refrigerator-absorber by evaporation of the cold medium there, when heat is abstracted and this heat is taken from the surroundings of the evaporating cold medium.

According to the invention such cold and absorption mediums are used and the construction and arrangement of the evaporation surfaces as well as the construction and arrangement of the refrigerator and the absorber relative to each other is such that the evaporated cold medium without substantial diffusion in the auxiliary medium descends directly after evaporation through the auxiliary medium to the absorption medium flowing in or descending in the absorber. According to the invention the evaporation surfaces are of such a form and are so arranged that the cold medium vapours without substantial obstruction by the evaporation surfaces or other members in the apparatus may gravitate directly after evaporation from the liquid cold medium as currents or films along the walls of the apparatus through the auxiliary medium, to the absorption medium in very much the same way as ether or carbon dioxide vapours may be poured from one vessel to another in the air.

Owing to the special construction of the evaporation and/or absorption surfaces the cold medium vapours are also in addition to gravity subjected to friction from the liquid cold medium and/or absorption medium flowing down over the evaporation and absorption surfaces and thus the transfer of the cold medium vapours from the refrigerator to the absorber is further facilitated.

Further, as the vapour pressure above the cold medium is higher than above the absorption solution, this difference in vapour pressure also assists in conveying the cold medium vapours from the refrigerator to the absorber.

When the cold medium vapours move downward through the auxiliary medium friction takes place between the said vapours and the auxiliary medium, the effect of which is to partly check the motion of the cold medium. The friction or impact also causes the auxiliary medium to move or circulate, but this motion of the auxiliary medium is of no use whatever. The only object of the auxiliary medium is to equalize the pressure in the apparatus and the elimination of the auxiliary medium from the apparatus would, provided that the pressure differences were maintained in some other way, allow of a more rapid transfer of the cold medium vapours from the refrigerator to the absorber. On the other hand, the friction between a gas and a smooth surface is much less than the friction between two gases, and according to the present invention the friction between the descending cold medium vapours are therefore reduced by inserting in the refrigerator and/or absorber or in the combined refrigerator-absorber special intermediary guide plates or tubes, channels, etc., the effect of which is to further facilitate the transfer of the cold medium from the refrigerator to the absorber.

The accompanying drawings show some embodiments of the invention, which will be more fully described hereinafter.

Like reference numerals in the figures denote like parts.

Figures 1, 2, 3, 4, 5, 6, 7, 8:
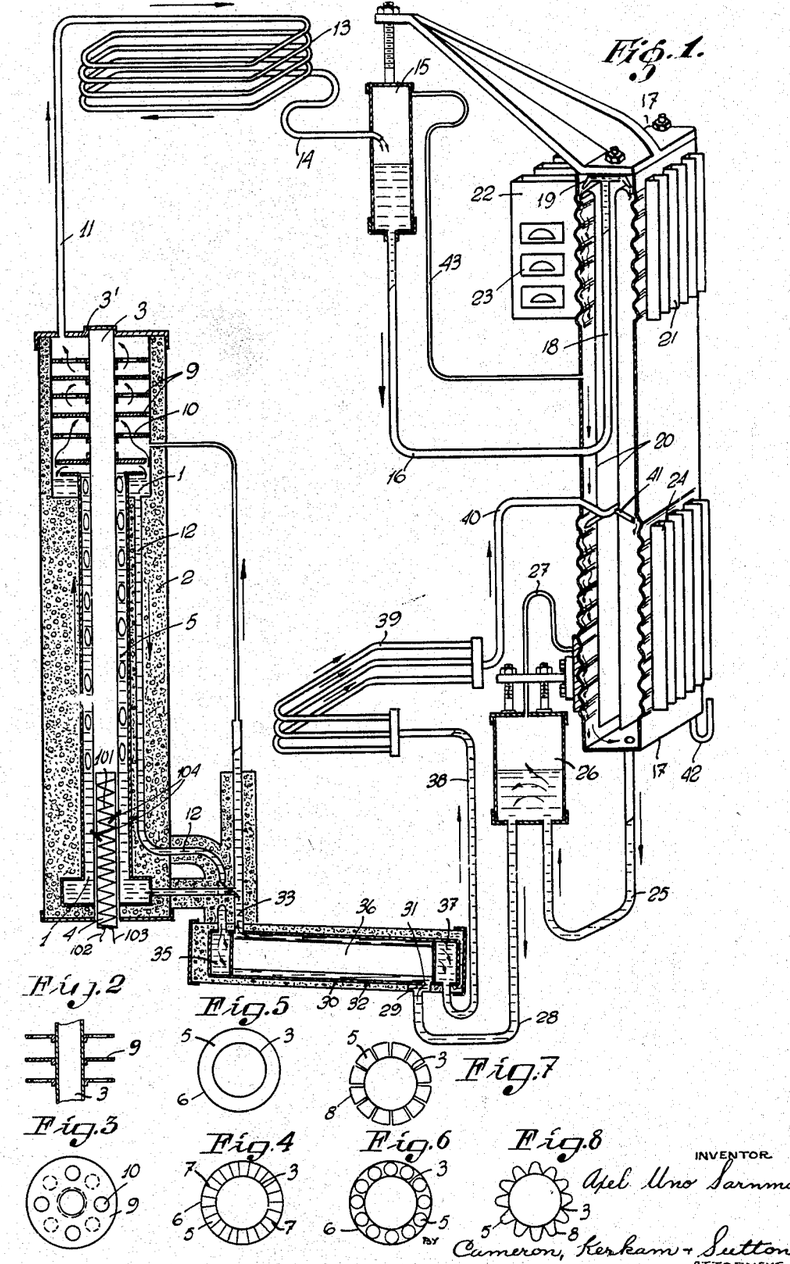
Fig. 1 shows a complete absorption system according to the invention, partly in perspective and partly in section, parts of the apparatus being broken away to show the interior of the apparatus.
Figs. 2 and 3 show in section and in plan a special means in the upper part of the generator for separating cold medium vapours from absorption solution.
Figs. 4–8 show different embodiments of the heat channels of the generator in cross-section.

In Fig. 1, 1 is the generator surrounded by the insulation 2. In the generator is a channel 3, preferably consisting of a tube or the like. In the lower part of this tube is provided an electric heater 4 or some other heat source. Suitable means may be provided for regulating the heating effect of this heater so that the cold effect may be varied. Such devices are known per se and there is no need to describe them here. The heated gases or combustion gases pass through the tube 3 and may then, before they leave the generator, be passed also in contact with the outer sides thereof. When an electric heater is used the top of the channel 3 is covered by a lid 3'.

The tube 3 is surrounded by one or more longitudinal channels 5, for example having the forms shown in Figs. 4–8 in cross-section. According to Fig. 4 the tube 3 is surrounded by a number of channels 5, obtained by providing round the tube 3 another tube 6 and between the two tubes transverse walls 7. Fig. 5 shows a single channel 5 between an inner tube 3 and an outer tube 6. According to Fig. 6 a number of tubes 5' are provided round the tube 3 and form the channels 5. According to Fig. 7 and 8 the channels 5 are obtained by surrounding the tube 3 with a corrugated member 8.

In the upper part of the generator 1 a number of baffle plates 9 are inserted, shown in section and in plan from above in Figs. 2 and 3. These plates are provided with a number of holes 10, which in the various plates are displaced relatively each other.

To the upper part of the generator is connected a pipe 11 for conduction of evaporated cold medium vapours and further a pipe 12 for conduction of poor absorption solution. The pipe 11 is connected with a condenser 13, which in turn by means of a flexible tube 14 is connected with a vessel 15, which may be raised or lowered by any suitable means, such as the bolt and nut construction shown on the drawings. The lower part of the vessel 15 is by means of a flexible tube 16 and a rising pipe 18 connected with a number of nozzles or distributors 19 disposed in the upper part of the combined refrigerator-absorber 17.

The walls in the upper and the lower part of the refrigerator-absorber may be plane but are preferably corrugated, lengthwise or crosswise as shown in the figures. Within the refrigerator-absorber intermediary walls 20 are provided. Instead of these intermediary walls a tube or the like may be used.

The upper part of the refrigerator-absorber 17 is provided with a number of cooling flanges 21 which preferably are dark or blackened so as to augment the heat radiation, and further with chambers 22 containing boxes 23 for the production of ice-cubes. The lower part of the refrigerator-absorber is also provided with cooling flanges 24. The flanges 24, as well as the upper and lower parts of the refrigerator-absorber, are also preferably dark or blackened.

Figure 17:
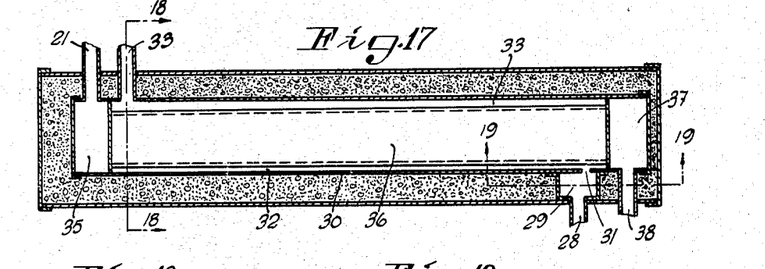
Figs. 17–19 show sections of the temperature exchanger.
Figure 18:
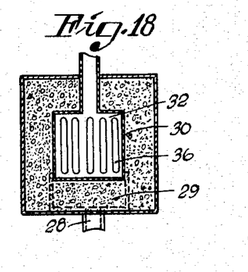
Figure 19:
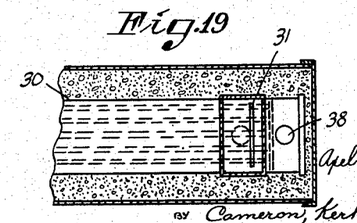

To the lower part of the refrigerator-absorber is connected a flexible pipe 25, the other end of which is connected to a vessel 26 which by any suitable means, such as the bolt and nut construction shown on the drawings, may be raised or lowered at will. The upper part of this vessel 26 is by means of a flexible pressure equalizing pipe 27 connected to the interior of the refrigerator-absorber and the lower part thereof is by means of a flexible pipe 28 connected to the ante-chamber 29 of the temperature exchanger 30, shown in detail in Figures 17–19. The ante-chamber 29 communicates through the slit 31 with one end of the chamber 32, the other end of which by means of the pipe 33 is connected with the interior of the generator, and by means of the pressure equalizing pipe 34 with the upper free space of the generator. The pipe 12 from the upper part of the generator is connected with the distributing chamber 35 in the temperature exchanger and this chamber is by means of the pipes 36 connected with the distributing chamber 37. The chamber 37 is in turn by means of the pipe 38, the cooler 39 and the pipe 40 connected with the distributors or nozzles 41 in the lower part of the refrigerator-absorber.

The apparatus is filled with a cold medium, an absorption medium and an auxiliary medium, and a tube 42 is provided for this purpose. The tube 42 may be made by filling a straight tube with a metal of low melting point, for example tin, lead, cadmium or other suitable substance, whereafter a hole is made in the same through the said material and the pipe is bent. The apparatus may then be sealed after filling by heating the tube bend, when the metal remaining in the tube will melt and close the tube.

The apparatus works as follows:

When the generator 1 is heated by means of the heater 4 the heat is conveyed through the walls of the tube 3 to the mixture of cold medium and absorption medium in the channels 5 and the cold medium is driven off in the form of gas bubbles which collect in the channels 5 as shown in the figure. This has the effect of reducing the mean specific gravity of the liquid in the channels 5 and under the pressure of the cold absorption solution in the pipe 25, the vessel 26 and the pipe 28 the mixture of liquid and gas bubbles rises in the generator to the upper part thereof. The upper part of the generator is enlarged to one or more chambers in which the evaporated cold medium vapours expand and thereafter through the holes 10 in the baffle plates 9 pass off through the pipe 11 to the condenser 13, in which they are condensed and then collected in the vessel 15. The action of the baffle plates 9 is to mechanically prevent any absorption solution which has been conveyed into the upper part of the generator from accompanying the cold medium vapours from the generator. The rising cold medium vapours expel the auxiliary medium from the pipe 11 and part of the coil 13 and the cold medium vapours are liquefied in that part of the coil, in which they are cooled to the temperature corresponding to the condensing temperature of the cold medium at the pressure of the auxiliary medium. The other part of the condenser coil as well as the upper part of the vessel 15 still contain auxiliary medium, through which the liquefied cold medium passes into the vessel 15. From the vessel 15 the cold medium passes through the pipes 16 and 18 to the nozzles or distributors 19 in the refrigerator, through which the cold medium is distributed so as to flow down the evaporation surfaces, i. e. the inner walls of the refrigerator, as shown on the drawings by the arrows. The evaporation surfaces are preferably roughened, for example sand-blasted, or may be covered with porous material. The cold medium flowing down along the evaporation surfaces evaporates under abstraction of heat, and, as the cold medium vapours used are of considerable weight and density relatively to the auxiliary medium, these immediately gravitate downwards through the auxiliary medium present in the refrigerator-absorber to the absorption medium flowing in or descending in the lower part of the refrigerator-absorber. The heat abstracted in the evaporation of the cold medium is taken from the surroundings, for example from water contained in the boxes 23 or from any medium surrounding the upper part of the refrigerator-absorber, for example air, which is thereby cooled.

The downward motion of the cold medium vapours is also furthered by friction with the cold medium liquid or the absorption solution flowing down the evaporation and absorption surfaces, and also by the difference in pressure above the cold medium liquid in the refrigerator and the absorption solution in the absorber contributes to this motion.

The level of cold medium liquid in the vessel 15 adjusts itself somewhat above the level of the distributors 19, so that the difference in liquid pressure corresponds to the friction in the pipes 16 and 18 and in the distributors 19 as well as to the amount of cold medium circulating through the system per unit of time. In order to maintain the same pressure in the vessel 15 as in the refrigerator-absorber the free spaces in these vessels are in communication with each other through the pipe 43. As a result thereof, a certain quantity of the cold medium is retained in the vessel 15, said quantity being taken from the absorption solution (i. e. the mixture of cold medium and absorption medium) in the lower parts of the system, for example the generator 1, the temperature exchanger 30 and the vessel 26 etc., the concentration of the absorption solution in the lower parts of the apparatus, i. e. the relative proportions of cold medium and absorption medium, may be varied within certain limits by raising or lowering the vessel 15 and thus varying the amount of liquid therein.

As already stated, when the cold medium sinks through the auxiliary medium unwanted friction takes place between the cold medium vapours and the auxiliary medium or between such parts of the auxiliary medium which are directly acted upon by the cold medium vapours and the other parts of the auxiliary medium, whereby the downward motion of the cold medium vapours is retarded. In addition the auxiliary medium must be displaced in one direction or other by the cold medium vapours which further impedes the motion of the cold medium vapours. By the provision of the walls 20 the friction is reduced and the displacement of the auxiliary medium is facilitated.

As mentioned above, part of the absorption solution is conveyed into the upper part of the generator together with the cold medium and collected there. From this upper part the poor absorption solution passes through the pipe 12 into the chamber 35 in one end of the temperature exchanger 30 and then through the tubes 36 into the distributing chamber 37 in the other end of the temperature exchanger. From the chamber 37 the poor absorption solution passes through the pipe 38, the cooler 39 and the pipe 40 to the nozzles or distributors 41 by which it is distributed over and flows down the absorption surfaces in the lower part of the refrigerator-absorber, i. e. the inner wall thereof. In flowing over the absorption surfaces the poor absorption solution should be as cool as possible and the required cooling is effected in the temperature exchanger 30 and in the coil 39. The poor absorption solution flowing down over the absorption surfaces absorbs the cold medium vapours coming from the upper part of the refrigerator-absorber and the absorption heat is given off through the walls of the apparatus and the flanges 24 to the surrounding air. The absorption solution thus concentrated with cold medium then passes through the pipe 25 to the vessel 26 and thereafter through the pipe 28 to the ante-chamber 29 of the temperature exchanger 30. From here it passes through the slit 31 and through the chamber 32 outside the tubes 36, and then through the pipe 33 to the lower part of the generator 1. The cycle is then repeated. Any cold medium vapours driven off in the temperature exchanger pass off into the upper part of the generator through the pipe 34. The poor and concentrated absorption solutions thus pass through the temperature exchanger 30 in opposite directions and exchange temperature and heat, so that the poor absorption solution is pre-cooled before entering the cooler 39 and the rich or concentrated solution is pre-heated before entering the generator 1. Owing to the special construction of the temperature exchanger this exchange of temperature is very effective and the efficiency of the system is increased.

Provided that the heat supplied to the generator is constant the quantity of absorption solution raised in the generator 1 per unit of time depends on the original liquid level in the generator, which in turn depends on the liquid level in the vessel 26. The cross-section of the vessel 26 should be considerably larger than the total cross-sectional area of the channels 5 and it is therefore possible by raising or lowering the vessel 26 to alter the liquid level in the generator and consequently also the velocity of circulation through the system. The pipe 27 serves to maintain the same pressure in the vessel 26 as in the refrigerator-absorber. The liquid level in the vessel 26 as well as in the pipe 12 also depends to some extent upon the frictional resistances in the pipes etc. and the velocity of flow of the liquids. All pipes or conduits connected to such vessels which are adapted to be raised and lowered should be more or less flexible.

Figs. 9, 10, 11, 14, 15 and 16 show other embodiments of the combined refrigerator-absorber.

Figures 9, 10, 11, 12, 13:
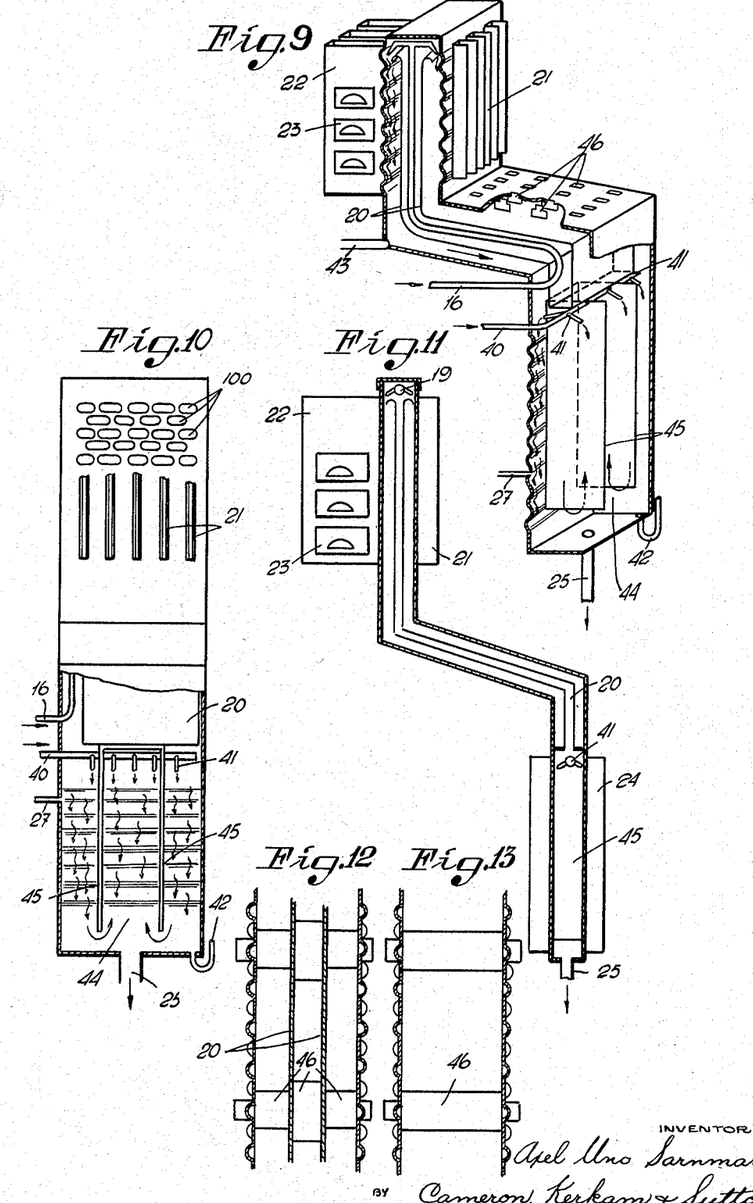
Fig. 9 shows a perspective view of a combined refrigerator and absorber according to the invention with parts broken away to show the interior of the apparatus.
Fig. 10 is a side view of the apparatus shown in Fig. 9, a part thereof being broken away to show the interior.
Fig. 11 is a front view, partly in section, of a somewhat modified refrigerator-absorber.
Figs. 12 and 13 show in detail means for reinforcing the walls of such parts of the apparatus which require strengthening.

The refrigerator-absorber shown in Fig. 9 differs from that shown in Fig. 1 in that it is bent in the middle and that a modified form of intermediary walls is used. The intermediary walls 20 terminate in the upper part of the absorber and instead transverse plates 45 are provided in the absorber, as clearly shown in the drawings. On their way downward the cold medium vapours displace the auxiliary medium at 44 in the direction of the arrows in between the plates 45 and such cold medium vapours as accompany the auxiliary medium into the space between the plates 45 are absorbed by poor absorption solution flowing down between the plates 45.

Fig. 10 which is a side view of the refrigerator-absorber shown in Fig. 9, shows the modification in which the horizontal corrugations 100 of the walls in the upper part of the refrigerator-absorber are broken or discontinuous. The lower part of the figure shows the interior of the absorber. Fig. 11 is a front view of a somewhat modified refrigerator-absorber, the construction of which should be self-evident. The refrigerator shown in these figures may be substituted for that shown in Fig. 1 by connecting the pipes 43, 16, 40, 27 and 25 with those shown in Fig. 1.

Figs. 12 and 13 show details of the means for reinforcing such parts of the apparatus which require strengthening, particularly when flat vessels are used, such as the refrigerator-absorber shown. 46 are stays or distance pieces disposed between the walls and secured to these in any suitable way for example by riveting, soldering, welding.

Figure 14:
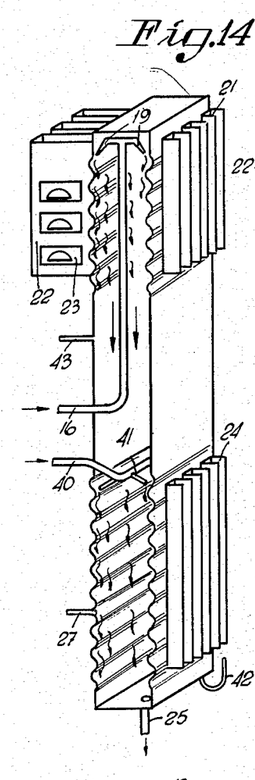
Figs. 14–16 show perspective views of further embodiments of the combined refrigerator-absorber, with parts broken away to show the interior of the apparatus.

The refrigerator-absorber shown in Fig. 14 differs from that shown in Fig. 1 in that the intermediary walls 20 have been removed. The removal of these walls increases the friction between the cold medium vapours and the auxiliary medium but removes another disadvantage. Thus when the auxiliary medium is displaced into the space between the walls 20 shown in Fig. 1 the auxiliary medium and in part also the cold medium vapours are to some extent transferred from the lower and warmer part of the refrigerator-absorber to the upper and colder part thereof, whereby cold calories are lost in the upper part and the efficiency of the apparatus is lowered. By removal of the walls 20 this harmful motion of the auxiliary medium and the cold medium vapours is lessened although not entirely avoided.

Figure 15:
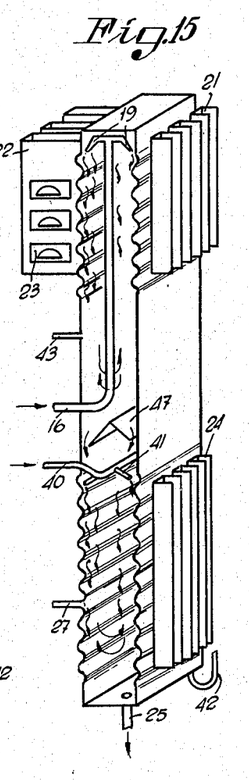

Fig. 15 shows a further embodiment of the refrigerator-absorber, which differs from that shown in Fig. 14 in that means are provided for preventing transfer of the auxiliary medium or cold medium vapours from the lower part of the refrigerator-absorber to the upper part thereof, said means comprising one or more baffle plates 47. The cold medium vapours flow from the upper part of the refrigerator-absorber past the member 47 to the lower part of the refrigerator-absorber but the motion of the mixture of auxiliary medium and cold medium vapours is limited to the lower part of the refrigerator-absorber and a harmful transfer of auxiliary medium or cold medium vapours from the lower to the upper part of the refrigerator-absorber is prevented or at least reduced.

Figure 16:
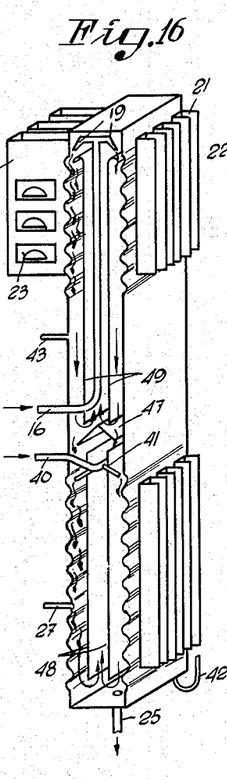

In the embodiment shown in Fig. 16 both intermediary walls 48 and 49 and baffle plates 47 are provided, whereby the friction between the descending cold medium vapours and the auxiliary medium is reduced and at the same time the motion of the auxiliary medium and the cold medium vapours admixed therewith is limited to separate paths in the upper and lower parts of the refrigerator-absorber. The intermediary walls 48 and 49 may be replaced by channels, tubes, etc.

The embodiments shown in Figs. 14–16 may be substituted for that shown in Fig. 1 by connecting the pipes 43, 16, 40, 27 and 25 with the corresponding pipes shown in Fig. 1.

Figure 20:
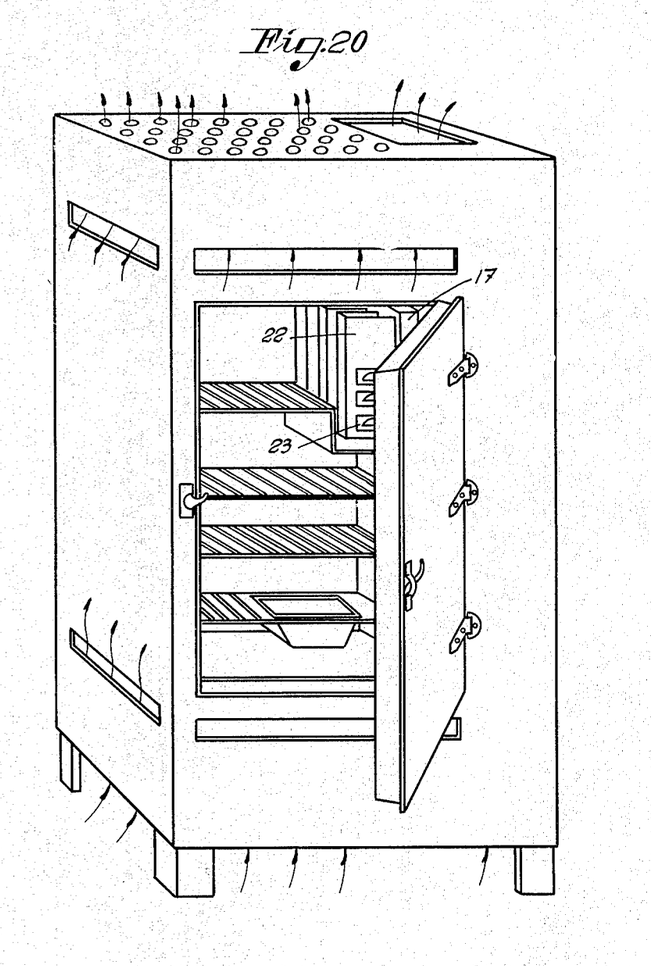
Fig. 20 is a view of a complete refrigerator according to the invention and Figs. 21–25 show the same refrigerator from different sides.
Figure 21:
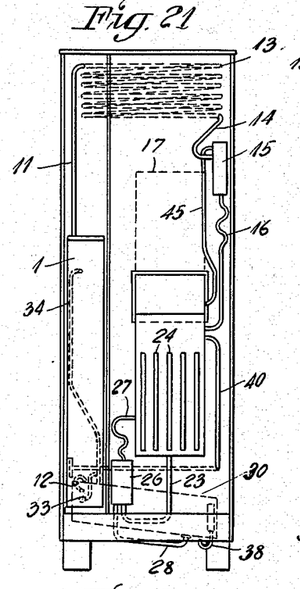
Figure 22:
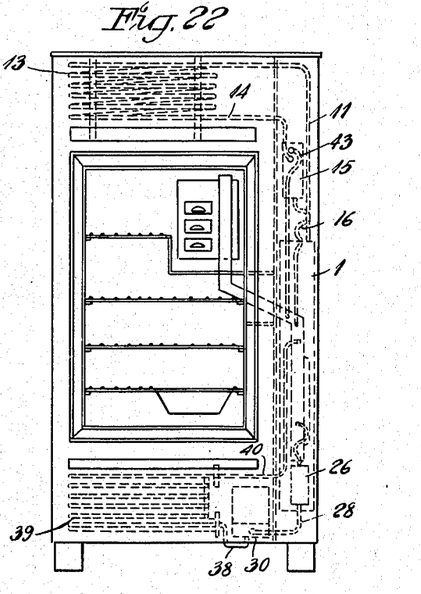
Figure 23:
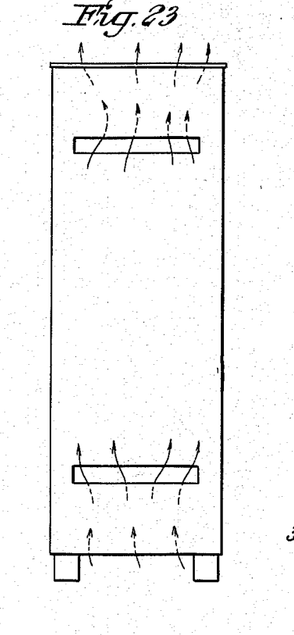
Figure 24:
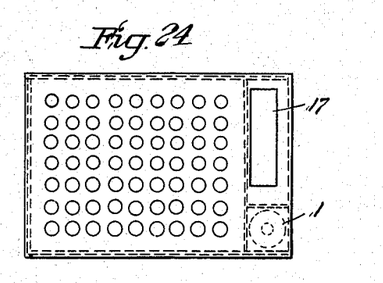

Figs. 20–25 show a complete refrigerator installation according to the present invention. Fig. 20 is a perspective view of the refrigerator and Fig. 21 shows the refrigerator viewed from the right side thereof with one of the protecting plates removed and part of the system shown in dotted lines. Fig. 22 is a similar view from the front with the door open. Fig. 23 shows the refrigerator viewed from the left side thereof, Fig. 24 from above and Fig. 25 from below. The reference numerals correspond to those used in Fig. 1.

Figure 25:
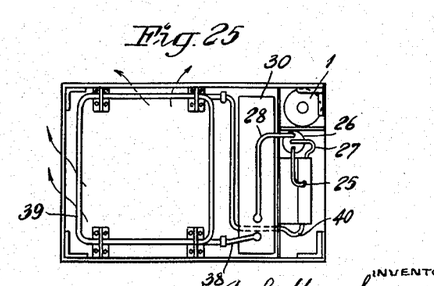
Figure 26:
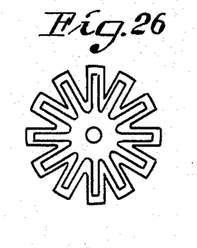
Figs. 26–36 show sections of different embodiments of the refrigerator-absorber as well as corrugations to be used therewith.
Figure 27:
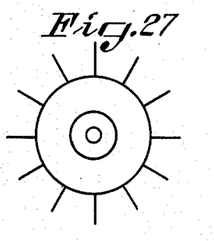
Figure 28:
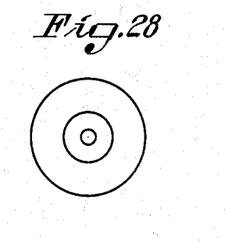
Figure 29:
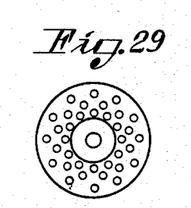
Figure 30:
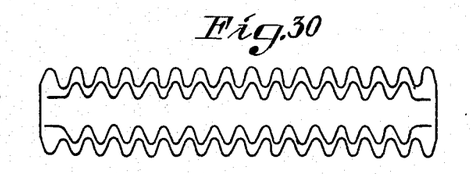
Figure 31:
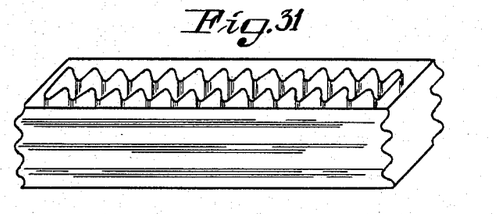
Figure 32:
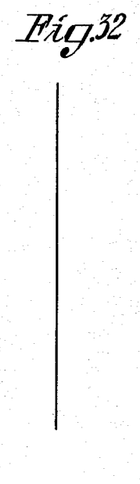
Figure 33:
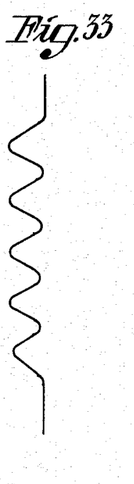
Figure 34:
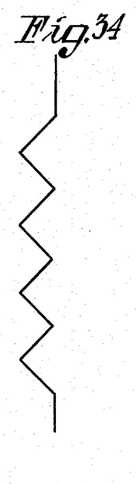
Figures 35, 36:
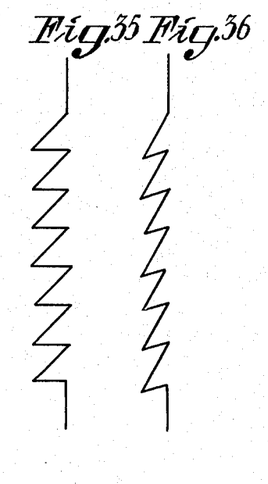

In Figs. 20, 23 and 25 the arrows indicate the air currents with which the condenser 13, the cooler 39 and the lower part of the refrigerator-absorber (the absorber) are cooled. For all these members requiring cooling draught-channels are provided in the refrigerator.

Many other modifications are possible without departing from the principle of the invention.

Thus the refrigerator and the absorber may be separate and connected by means of pipes. The cold medium vapours to be absorbed and the absorption solution may flow in counter-current or parallel relatively each other or both in counter-current and parallel, and evaporation and absorption surfaces may be provided on only one side or on several sides of the interior of the refrigerator and absorber. The containers in the apparatus may have any arbitrary sectional shape, for example round, flat or many-sided. Instead of air cooling water cooling may be used.

The invention also comprises means for improving and facilitating the heat transmission from the heater to the liquid in the generator to be conveyed to the upper part thereof. In Fig. 1 the heater 4 is shown as a spiral of resistance wire 101 wound on a suitable body and heated by electric current supplied to the ends of said wire through the conductors 102 and 103. Between the heater 4 and the channels 5 are provided one or more heat conducting members 104, for example in the form of a wire and of good heat conductibility. This member is in direct heat conduction with the heater on the one hand and with the liquid in the channels 5 on the other hand. The said member may be made of copper, silver, platinum or the like. The object of this member is to concentrate the heat supply to the liquid pump and to ensure a smooth and reliable transport of the liquid therein to the upper part of the generator. When using this member 104 it is not necessary that the inner walls of the channels 5 should be in direct contact with the heater, as the total heat supply to the pump may take place through the member or members 104.

Further embodiments of the combined refrigerator-absorber are shown in Figs. 26–31 in section. Suitable forms of corrugations are shown in Figs. 32–36. The condenser 13 may be made in a similar way.

It is also possible to use propellers, screws, turbine wheels or the like to assist in the transfer of the cold medium vapours from the upper part of the refrigerator-absorber to the lower part thereof or from the refrigerator to the absorber when separate refrigerators and absorbers are used.

Figure 37:
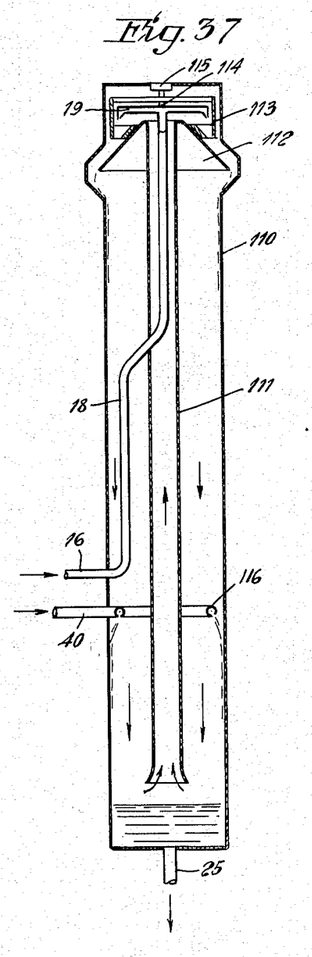
Figs. 37–39 show further embodiments of the refrigerator-absorber in section and Fig. 40 in view.

Such an embodiment of the invention is shown in Fig. 37. 110 is the combined refrigerator-absorber, and in the centre thereof is arranged a tube 111, provided at its top with a conical disk 112. Above this disk 112 is provided a rotatable turbine wheel 113 or the like carried by the pin 114 and guided by the bearing 115. As before, 19 are the nozzles for distributing the cold medium condensate entering through the pipe 18. 116 are nozzles for distributing the absorption medium entering through the pipe 40 and 25 is the exit for the concentrated absorption solution. The apparatus is used instead of the refrigerator-absorber shown in Fig. 1 by connecting pipes 16, 40 and 25 with the corresponding pipes shown in Fig. 1. The cold medium condensate is ejected through the distributor 19 and passes through the turbine wheel 113 which is thereby set in motion. The cold medium condensate is then distributed over the disk 112 and thereafter over the walls of the refrigerator-absorber which act as evaporating surfaces. In the lower part of the refrigerator-absorber the cold medium is absorbed in the absorption medium and any auxiliary medium carried away from the upper part of the apparatus with the cold medium vapours returns to the upper part of the refrigerator-absorber through the tube 111, said return being facilitated by the action of the turbine wheel 113.

The distributor 19 and the turbine wheel 113 may also be arranged in other ways, for example so that the cold medium condensate is supplied from the side instead of from the middle and the turbine wheel may be disposed further down in the refrigerator-absorber.

Figure 38:
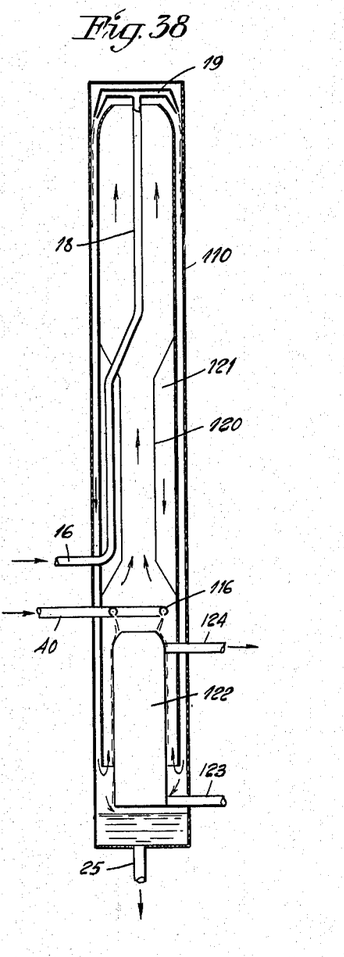

Fig. 38 shows a further embodiment of the refrigerator-absorber, in which the inner member 120 is constricted in the middle thereof and provided with heat conducting flanges 121. The cold medium enters as before through the pipe 18 and is distributed through the nozzles 19 over the inner walls of the refrigerator-absorber 110. In the lower part of the refrigerator-absorber a cooler 122 is provided with an inlet 123 and an outlet 124, by means of which water is passed through the cooler. The absorption in the lower part of the refrigerator-absorber of the cold medium vapours, admixed with auxiliary medium, takes place in countercurrent to the poor absorption solution flowing down over the absorption surfaces of the cooler 122. The heat liberated in the absorption is taken up by the water passing through the cooler. The apparatus may be substituted for the refrigerator-absorber shown in Fig. 1 by connecting pipes 16, 40 and 25 with the corresponding pipes shown in Fig. 1.

Figure 39:
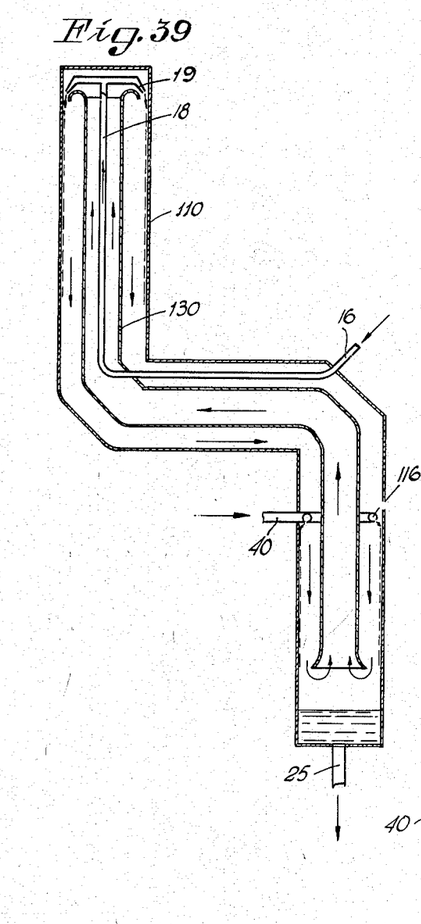
Figure 40:
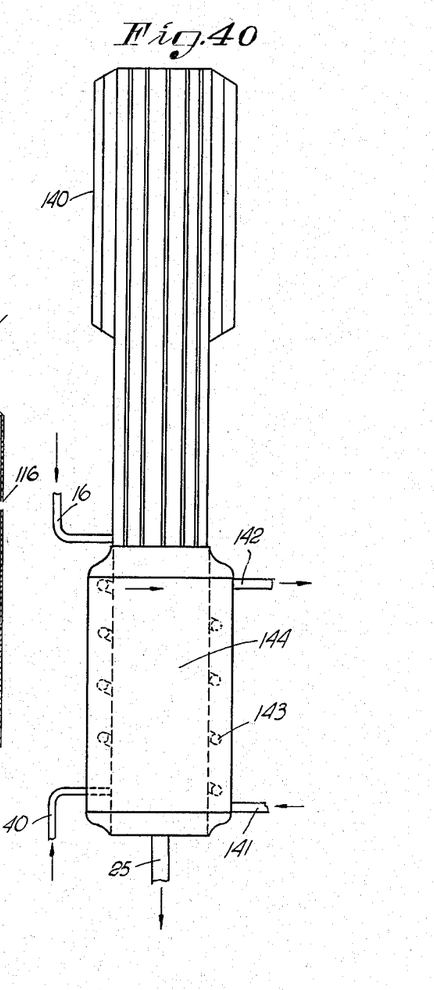

Further embodiments of the combined refrigerator-absorber are shown in Figs. 39 and 40. As before the cold medium enters through the pipe 18 and is distributed through the nozzles 19 over the inner walls of the refrigerator 110, where it evaporates. The absorption solution enters at 40 and is distributed through nozzles 116 over the inner walls of the absorber. The characteristic feature of this embodiment of the invention is that the refrigerator-absorber is bent in the middle, otherwise the action is the same as in the embodiments described with reference to Figs. 37 and 38. The object of bending the refrigerator-absorber in the middle is to save space in an installation of the kind shown in Figs. 20–25.

In all embodiments of the refrigerator-absorber described above the middle part of the refrigerator-absorber acts as a heat exchanger between the descending cold mixture of cold medium and auxiliary medium and the rising warm auxiliary medium. The inner intermediary walls or tubes should terminate at a suitable point in the absorber, so that an effective return of the auxiliary medium is obtained.

According to Fig. 40 the upper part of the refrigerator-absorber is provided with heat conducting flanges 140 and the lower part is cooled by a liquid, passing through the cooler 144, entering at 141 and leaving at 142. The cold medium enters at 16 and the absorption medium at 40. The absorption medium passes through the coil 143 surrounding the cooler 144 and is distributed over the outer sides thereof.

As already stated, the refrigerator-absorber may also be made in two or more parts, for example one or more refrigerators, one or more absorbers and one or more temperature exchangers between them, which may also be a part of the refrigerator or the absorber. When separate refrigerators and absorbers are used the conduits between them should be such that a rapid and good transfer from the refrigerator to the absorber of the mixture of cold medium vapours and auxiliary medium, and a rapid and good return of the auxiliary medium to the refrigerator, may take place.

Such movable members within the apparatus as rotating propellers, turbine wheels and the like, or oscillating wings or the like, may also be driven by means of electric, magnetic or electrodynamic forces, generated within or without the apparatus, for example rotating or oscillating magnetic fields.

Instead of using the walls of the refrigerator and the absorber as evaporation and absorption surfaces other surfaces may be provided within the refrigerator or absorber for this purpose and may be water-cooled. The refrigerator may further be made as one or more parallel or series connected or parallel and series connected members, containers, tubes, cells or the like or a combination thereof and may further be made as round, many-sided or flat containers, tubes, cells or the like or combinations thereof.

The length of the refrigerator-absorber should be such that the middle part thereof, as already mentioned, functions as a heat exchanger between the cold mixture of cold medium vapours and auxiliary medium leaving the refrigerator and auxiliary medium returning to the refrigerator. Or the refrigerator may be provided with so large evaporation surfaces or supplied with only such a quantity of liquid cold medium that the middle part thereof as mentioned above functions as a temperature exchanger. The temperature-exchanging part, that is, the members in which heat exchange takes place, may further, in addition to the heat conducting flanges already mentioned, be provided with channels, tubes, folds, corrugations or the like, so that an effective temperature exchange is obtained. Further the refrigerator should be on a higher level than the absorber.

When separate refrigerators and absorbers are used they may have such a length that a part thereof, for example the lower part of the refrigerator or the upper part of the absorber, functions as a temperature exchanger between the cold mixture passing from the refrigerator to the absorber on the one hand and on the other hand the auxiliary medium passing from the absorber to the refrigerator. The conduits between the refrigerator and the absorber should be such that the descending mixture of cold medium and the returning auxiliary medium and the liberated auxiliary medium are brought close together in the refrigerator or the absorber or both and by means of heat exchanging members change heat and temperature. Said heat conducting members may also be made as described for the temperature-exchanging part of the combined refrigerator-absorber. The separate refrigerators and absorbers or the details thereof may also otherwise be constructed as already described for the refrigerator part or absorber part of the combined refrigerator-absorber. Further the temperature exchanging part in the refrigerator or the absorber or the combined refrigerator-absorber should be so disposed within or without the room or rooms which are to be cooled that the maximum of cold effect is obtained.

The condenser 13 may also be constructed for water cooling or for both air and water cooling.

When air cooling is used special means may be provided for the cooling of such parts which for their proper functioning require the abstraction of heat, as for example the condenser and the absorber. These means may comprise draught funnels, cylinders or the like, surrounding those parts to be cooled and arranged so as to be passed by air currents.

As already mentioned such members of the apparatus which are to give off or take up heat may be made with dark surfaces, preferably black, and may in addition be roughened, sand-blasted or the like. This improvement is of course applicable to all kinds of cold apparatus in which air cooling is used. If the material used is copper the surfaces are easily blackened by treatment with sulphur compounds, for example liver of sulphur. If some other material is used the surfaces may first be coppered and then treated with sulphur compounds.

It has also been mentioned that such members in the apparatus which are subjected to an internal or external pressure may be provided with stays or strengthened, and it is evident that this improvement is applicable to all kinds of cold producing apparatus. This strengthening makes it possible to use a thinner material and to use other shapes than the circular, for examples many-sided or flat. As example of such members may be mentioned the generator, the refrigerator, the absorber, the temperature exchanger, the combined refrigerator-absorber, the condenser, various kinds of coolers etc. According to the invention such members are provided with stays or supports which may be joined to the walls of the vessel by riveting, soldering, welding etc. The stays 46 shown in Fig. 9 should of course be provided not only in the middle of the refrigerator-absorber but also in the upper and lower part thereof. As shown in Fig. 12 stays or distance pieces 46 are provided between the intermediary walls 20 as well as between these walls and the outer walls of the refrigerator-absorber. Fig. 13 shows a section through a refrigerator-absorber in which there are no intermediary walls but provided with stays or distance pieces 46. The stays are preferably flat and rectangular in section, although round or square stays may be used.

What I claim is:—

1. Absorption cold apparatus including a refrigerator for evaporation of a cold medium, an absorber for absorption of the cold medium vapours, an absorption medium in said absorber, a pressure equalizing auxiliary gas, a cold medium adapted to be evaporated in said refrigerator, the evaporation surfaces of the refrigerator being on a higher level than the absorption surfaces of said absorber and said gas having a lower specific gravity than the cold medium vapours, means for delivering the cold medium in liquid form to said evaporation surfaces, and means providing a free and unobstructed passage for the cold medium vapours in the refrigerator and from the latter to the absorber, the evaporation surfaces over which the liquid cold medium is made to flow being sufficiently inclined to the horizontal and the absorption surfaces being so disposed with respect to the passage through which the cold medium vapours pass from the refrigerator to the absorber that the pressure-equalized cold medium vapours, immediately after evaporation from the evaporation surfaces, flow along the latter surfaces to and over the absorption surfaces of the absorber through the auxiliary gas under the direct action of gravity.

2. Absorption cold apparatus including a refrigerator for evaporation of a cold medium, an absorber for absorption of the cold medium vapours, an absorption medium in said absorber, a pressure equalizing auxiliary gas, a cold medium adapted to be evaporated in said refrigerator, the evaporation surfaces of the refrigerator being on a higher level than said absorber and said gas having a lower specific gravity than the cold medium vapours, means for delivering the cold medium in liquid form to said evaporation surfaces, and means providing a free and unobstructed passage for the cold medium vapours in the refrigerator and from the latter to the absorber, the evaporation surfaces over which the liquid cold medium is made to flow being sufficiently inclined to the horizontal so that the pressure-equalized cold medium vapours, immediately after evaporation from the evaporation surfaces, flow in the refrigerator and from the latter to the absorber through the auxiliary gas under the direction action of gravity, said refrigerator and absorber being substantially in the form of an oblong parallelepiped provided with two internal intermediary walls arranged longitudinally so as to divide the interior substantially into three separate compartments.

3. Absorption cold apparatus including a refrigerator for evaportion of a cold medium, an absorber for absorption of the cold medium vapours, an absorption medium in said absorber, a pressure equalizing auxiliary gas, a cold medium adapted to be evaporated in said refrigerator, the evaporation surfaces of the refrigerator being on a higher level than said absorber and said gas having a lower specific gravity than the cold medium vapours, means for delivering the cold medium in liquid form to said evaporation surfaces, and means providing a free and unobstructed passage for the cold medium vapours in the refrigerator and from the latter to the absorber, the evaporation surfaces over which the liquid cold medium is made to flow being sufficiently inclined to the horizontal so that the pressure-equalized cold medium vapours, immediately after evaporation from the evaporation surfaces, flow in the refrigerator and from the latter to the absorber through the auxiliary gas under the direct action of gravity, said refrigerator and absorber being substantially in the form of an oblong parallelepiped having an internal transverse baffle plate arranged therein to divide the interior substantially into an upper and a lower compartment to prevent unwanted transfer from the absorber to the refrigerator of auxiliary medium or cold medium vapours and for preventing unwanted circulation of said vapours and medium.

4. Absorption cold apparatus including a generator and an absorber through which an absorption medium is made to circulate, and means for regulating the circulation velocity of the absorption medium by raising and lowering the initial liquid level in the generator, including a receptacle external of the generator and in communication with the liquid therein, and means for raising and lowering said receptacle.

5. Apparatus as claimed in claim 4, including a generator, an absorber and a temperature exchanger intermediate of and in communication with said generator and absorber wherein said receptacle is connected between and in communication with said absorber and said temperature exchanger.

6. Apparatus as claimed in claim 4 wherein the cross-sectional area of said receptacle is substantially larger than the cross-sectional area of the liquid in the generator.

7. Apparatus as claimed in claim 4 wherein the upper part of the said receptacle is in communication with the free space of the absorber or the generator.

8. Absorption cold apparatus including a refrigerator, an absorber, cold and absorption mediums therein, and means for regulating the relative proportions of cold medium and absorption medium in the apparatus comprising a receptacle in communication with the liquid cold medium for constantly withdrawing part thereof from circulation and means for raising and lowering said receptacle so as to raise or lower the liquid level therein and thereby change the volume of liquid cold medium withdrawn from circulation.

9. Apparatus as claimed in claim 8 including a condenser and a refrigerator, wherein the upper part of the said receptacle is in communication with the condenser of the system and the lower part thereof with the supply to the refrigerator and the free space of the said receptacle is in communication with the free space of the refrigerator.

10. In an absorption refrigerating system containing a cold medium and an absorption medium, a combined refrigerator and absorber having a vertically positioned surface over which both the cold medium and the absorption medium flow, means for delivering said cold medium to the upper end of said surface, and means for delivering the absorption medium to the same surface at a point intermediate the ends thereof in a vertical direction, said surface being continuous and unobstructed throughout the length of the combined refrigerator and absorber, whereby the cold and absorption mediums flow over the same surface and in the same direction by gravity action.

11. In an absorption refrigerating system containing a cold medium and an absorption medium, an elongated shell forming a refrigerator with substantially vertical evaporation surfaces at the upper end and an absorber at the lower end, a wall within the shell so constructed as to form a plurality of vertical flues, means for so delivering said cold medium to the upper part of one of said flues and against the inside wall of said shell that said cold medium will flow downwardly over and evaporate from said surfaces, and means for so delivering said absorption medium to the same flue at a lower point than the point of delivery of said cold medium that said absorption medium will flow downwardly over the said inside wall at the lower part of the shell in contact with and in the same direction as the flow of the cold medium vapours.

12. In an absorption refrigerating system containing a cold medium, an absorption medium and an auxiliary medium, an elongated shell forming a refrigerator with substantially vertical evaporation surfaces at the upper end and an absorber at the lower end, a wall within the shell of less length than the shell dividing the interior thereof into a plurality of vertical flues, means for delivering said cold medium to one of said flues and against the inside wall of the shell at the upper end thereof, and means for delivering the absorption medium to the same flue and against the inside wall of the shell at a point below the point of delivery of the cold medium so that the flow of the cold and absorption mediums is through the same flue and in the same direction while the return flow of the auxiliary medium is in a separate path through a separate flue.

13. In an absorption refrigerating system containing a cold medium, an absorption medium, and a pressure equalizing medium, a shell constituting a refrigerator with substantially vertical evaporation surfaces at one end and an absorber at the other end, a wall within the shell to form a plurality of flues, means for delivering the cold medium at the upper end of one flue, means for directing absorption medium into the same flue at a place below the delivery of the cold medium so that the two mediums descend by gravity in the same direction and direct the auxiliary medium upwardly through the other flue.

14. In an absorption refrigerating system containing a cold medium, an absorption medium, and a pressure equalizing medium, a combined refrigerator-absorber in the form of an oblong parallelopiped having at the upper end thereof a refrigerator with substantially vertical evaporation surfaces provided with two internal walls extending longitudinally and dividing the interior substantially into three compartments, means for directing the cold medium into the outer compartments whereby the cold medium descends through the two outer compartments and the auxiliary medium ascends through the central compartment.

15. In an absorption refrigerating system containing a cold medium, an absorption medium, and a pressure equalizing medium, a combined refrigerator-absorber in the form of an oblong parallelopiped having at the upper end thereof a refrigerator with substantially vertical evaporation surfaces, a transverse baffle intermediate the ends of the refrigerator-absorber dividing the interior into upper and lower compartments without preventing passage downward of the cold medium vapours along the walls of the refrigerator absorber and preventing the warmer mediums in the absorber from mixing with the cold vapours in the refrigerator.

16. In an absorption refrigerating apparatus, a generator, an absorber, and connecting means between the generator and absorber for circulating an absorption medium including a receptacle, and means for raising and lowering the receptacle to vary the initial level of the absorption medium in the generator.

17. In an absorption refrigerating apparatus, a generator, an absorber, and connecting means between the generator and absorber for circulating an absorption medium through the generator and absorber, a receptacle in the connecting means having a greater cross-sectional area than the cross-sectional area of the liquid in the generator, and means for vertically adjusting the receptacle for raising or lowering the level of the absorption medium in the generator.

18. In an absorption refrigerating apparatus, a generator, an absorber, and connecting means between the generator and absorber for circulating an absorption medium including a receptacle vertically adjustable to raise or lower the initial liquid level of the absorption medium in the generator, a connection between the lower part of the absorber and the receptacle for introducing the absorption medium from the absorber to the receptacle, and a connection between the upper part of the receptacle and the upper part of the absorber for equalizing the pressure in the receptacle and the absorber.

19. In an absorption refrigerating apparatus, a generator, a condenser, and a refrigerator, connecting means between the generator, condenser and refrigerator, a receptacle in the connecting means between the condenser and refrigerator, and means for raising and lowering the receptacle to vary the rate at which the cold medium is introduced into the refrigerator.

20. In an absorption refrigerating apparatus, a generator, a condenser, a refrigerator and an absorber, means for connecting the generator, condenser and refrigerator, a receptacle in the connection between the condenser and refrigerator, said connecting means including a conduit between the lower part of the receptacle and the upper part of the refrigerator for introducing the cold medium into the refrigerator, and a conduit between the upper part of the receptacle and the lower part of the refrigerator for equalizing the pressure, and means for raising and lowering the receptacle to vary the amount of cold medium introduced into the refrigerator.

21. In an absorption refrigerating apparatus, a generator, a condenser, and a refrigerator, flexible conduits between the generator, condenser and refrigerator, and a vertically adjustable receptacle in the conduit between the condenser and refrigerator for varying the amount of cold medium introduced into the refrigerator.

22. In an absorption refrigerating apparatus, a generator, a heater for the generator, and a plurality of members extending through the wall of the generator for transmitting heat from the heater to the liquid in the generator at a plurality of points, said members being of a material having a greater heat conductivity than the wall of the generator.

23. In an absorption refrigerating apparatus, a hollow tubular generator, a heater in the hollow center of the generator, a plurality of heat conducting members extending through the inner wall of the generator for transmitting heat from the heater to the liquid in the generator, said members being of a material having a greater heat conductivity than the inner wall of the generator.

24. In an absorption refrigerating apparatus, a generator, a condenser, a refrigerator, an absorber, means for connecting the generator, condenser, refrigerator and absorber and a vertically adjustable collector receptacle for liquid refrigerant in the connection between the condenser and refrigerator, said receptacle and its connection with the refrigerator forming a liquid seal between the condenser and refrigerator.

AXEL UNO SÄRNMARK.